(12) United States Patent
Feldman et al.

(10) Patent No.: US 11,731,486 B2
(45) Date of Patent: Aug. 22, 2023

(54) SYSTEM FOR MONITORING AND/OR CONTROLLING THE AIR QUALITY IN A VEHICLE

(71) Applicant: CRISPIFY LTD, Herzliya (IL)

(72) Inventors: Adam Feldman, Herzliya (IL); Yoad Langer, Netanya (IL)

(73) Assignee: CRISPIFY LTD, Herzliya (IL)

( * ) Notice: Subject to any disclaimer, the term of this patent is extended or adjusted under 35 U.S.C. 154(b) by 10 days.

(21) Appl. No.: 17/310,817

(22) PCT Filed: Feb. 24, 2020

(86) PCT No.: PCT/IL2020/050200
§ 371 (c)(1),
(2) Date: Aug. 25, 2021

(87) PCT Pub. No.: WO2020/174462
PCT Pub. Date: Sep. 3, 2020

(65) Prior Publication Data
US 2022/0185060 A1      Jun. 16, 2022

Related U.S. Application Data

(60) Provisional application No. 62/809,872, filed on Feb. 25, 2019.

(51) Int. Cl.
*B60H 1/00*     (2006.01)

(52) U.S. Cl.
CPC ........... *B60H 1/0073* (2019.05); *B60H 1/008* (2013.01)

(58) Field of Classification Search
CPC .............................. B60H 1/0073; B60H 1/008
See application file for complete search history.

(56) References Cited

U.S. PATENT DOCUMENTS

| | | | |
|---|---|---|---|
| 6,758,739 B1 * | 7/2004 | Sangwan | B60H 3/0085 454/75 |
| 10,282,625 B1 * | 5/2019 | Wengreen | G01C 21/3484 |
| 10,315,492 B2 * | 6/2019 | Chelian | G01C 21/005 |
| 2009/0326760 A1 | 12/2009 | Clark et al. | |

(Continued)

FOREIGN PATENT DOCUMENTS

| | | |
|---|---|---|
| CN | 203293852 U | 11/2013 |
| CN | 207759874 U | 8/2018 |

(Continued)

*Primary Examiner* — Mohamed Barakat
(74) *Attorney, Agent, or Firm* — Vorys, Sater, Seymour and Pease LLP; Anthony P. Venturino; Maryellen Feehery Hank

(57) ABSTRACT

Provided is a control unit and a system for monitoring in real-time and/or controlling the air quality of a vehicle cabin. Upon receiving input data from various sensors in the cabin of the vehicle, the control unit processes the data and outputs a unified processed/calculated data of all the sensed data from sensors in the cabin that is indicative of the general air quality in the cabin. In addition, the control unit may output instructions of operations that need to be carried out for optimal circulation of the air that results in improvement of the air quality within the cabin. These instructions of operations may be also affected from data that is received by the control unit that is indicative of the air quality in the surrounding of the vehicle.

19 Claims, 8 Drawing Sheets

(56) References Cited

U.S. PATENT DOCUMENTS

| | | | |
|---|---|---|---|
| 2015/0032266 A1* | 1/2015 | Weast | B60H 1/00842 |
| | | | 700/276 |
| 2018/0057013 A1 | 3/2018 | Mullett | |
| 2018/0092603 A1 | 4/2018 | Duan et al. | |
| 2018/0281554 A1 | 10/2018 | Duan et al. | |
| 2019/0308487 A1* | 10/2019 | Badger, II | B60H 1/00821 |
| 2020/0207298 A1* | 7/2020 | Wensley | B60H 1/008 |
| 2020/0215915 A1* | 7/2020 | Faraji | B01D 46/442 |

FOREIGN PATENT DOCUMENTS

| | | |
|---|---|---|
| CN | 108621750 A | 10/2018 |
| DE | 29 03 643 A1 | 8/1980 |
| DE | 37 22 608 A1 | 2/1989 |
| DE | 10 2005 027 072 A1 | 12/2006 |
| FR | 3 055 585 B1 | 8/2018 |
| JP | 8-72535 A | 3/1996 |
| WO | 2015/149228 A1 | 10/2015 |
| WO | 2017/010719 A1 | 1/2017 |
| WO | 2017/149281 A1 | 9/2017 |

\* cited by examiner

SYSTEM FOR MONITORING AND/OR CONTROLLING THE AIR QUALITY IN A VEHICLE

TECHNOLOGICAL FIELD

The present disclosure is in the field of air quality monitoring and controlling of vehicles, in particular cars, e.g. for cars of the automotive industry.

BACKGROUND ART

References considered to be relevant as background to the presently disclosed subject matter are listed below:
DE 2903643
CN 203293852
FR 3055585
CN 207759874
CN 108621750

Acknowledgement of the above references herein is not to be inferred as meaning that these are in any way relevant to the patentability of the presently disclosed subject matter.

BACKGROUND

The cabin of cars is a relatively small space in which the air quality may be affected from various factors and at a relatively short period of time. The quality of air may be affected from extensive heat that release volatile organic matter from elements in the vehicle, outside pollution that penetrates the cabin, smoking in the vehicle, body smell of passengers etc.

The passengers have no means to monitor the quality of the air in real-time and carry out operations for circulating the air in the cabin for improving the air quality.

GENERAL DESCRIPTION

The present disclosure discloses a processing circuitry (being referred throughout the application as a control unit) and a system for monitoring in real-time and/or controlling the air quality of a vehicle cabin. Upon receiving input data from various sensors in the cabin of the vehicle, the control unit processes the data and outputs a unified processed/calculated data of all the sensed data from sensors in the cabin that is indicative of the general air quality in the cabin. In addition, the control unit may output instructions of operations that need to be carried out for optimal circulation of the air that results in improvement of the air quality within the cabin. These instructions of operations may be also affected from data that is received by the control unit that is indicative of the air quality in the surrounding of the vehicle.

It is to be noted that the instructions of operations may be carried out automatically by circulating or climate control system of the vehicle. This may be of a great advantage when a user may receive in advance, namely before he enters the vehicle, the real-time status of the air quality in the cabin of the vehicle and monitor the change of the air quality and the operations that are carried out automatically to improve the air quality. This could be implemented, for example, in the automotive industry.

Therefore, a first aspect of the present disclosure provides a control unit for real-time monitoring and/or controlling the air quality of a vehicle cabin, e.g. a car cabin. The control unit includes an input module that is configured to receive first sensing data indicative of sensed parameters of air within the cabin of the vehicle. The sensing data may comprise various raw or processed parameters that are sensed from various sensors that are located within the cabin that transmit the data in real-time. The control unit and any of its components may be disposed either within the vehicle or may be a part of a remote server, e.g. disposed in a cloud server and performing the processing in the cloud.

It is to be noted that in some embodiments the sensed data may comprise sensing parameters from a plurality of locations within the cabin, namely parameters that are sensed by distributed sensors, e.g. sensors that are located at a top portion and sensors that are located at bottom portion of the cabin of vehicle.

A processing module of the control unit is configured to process the first sensing data and to generate (i) processed/calculated cabin's air quality data. In some embodiments the control unit is further configured to generate (ii) operative data based on the processing of the first sensing data. The processed or calculated cabin's air quality data is indicative of the air quality in the cabin of the vehicle, and the operative data comprises operations for execution of defined actions for improving the air quality in the cabin, e.g. circulating external air into the vehicle, changing the temperature and venting power of the air condition system, etc.

The calculated cabin's air quality data and/or the operative data may be, in some embodiments, related to more than one location within the cabin of the vehicle. For example, the data of the quality of the air within the vehicle may be related to a rear or front portion thereof. In another example, the operative data may be indicative of operations that are required to perform for improving the air quality at a certain part of the vehicle, e.g. the top part of the vehicle, which supplies the majority of the air that is inhaled by passengers.

An output module of the control unit is configured and operable for outputting the calculated cabin's air quality data or the operative data to a user or an operative system that is capable of executing the defined actions.

The output module may output the calculated cabin's air quality data or the operative data by transmitting the data by a transmitting unit, by wireless transmission, e.g. via a cellular modem, Bluetooth unit or any other wireless connectivity. In some embodiments, the transmitting unit may transmit the data by wired connectivity.

In some embodiments, the input module is configured to receive second data indicative of quality of air outside to the vehicle, in the surrounding thereof. The processing module is configured to process the first sensing data and the second data, and to generate, based on the first sensing data and the second data, the (i) calculated cabin's air quality data and/or the (ii) operative data.

The vehicle's surrounding may be a radius of a predetermined distance from the vehicle, e.g. hundreds of meters up to a few kilometers from the vehicle. The data of the air quality in the surrounding of the vehicle may be an average function of several data pieces of a plurality of measurements of the air quality from several measuring and monitoring stations around the vehicle.

In some embodiments, the second data comprises data indicative of cars traffic in the vehicle's surrounding. It is to be noted that the input module is further configured to receive the real-time location of the vehicle, e.g. from a GPS or other real-time positioning system that is installed in the vehicle or from any other location-providing system that is in data communication therewith. Based on the real-time location of the vehicle, the relevant data of the surrounding of the car is retrieved. Data of the traffic in the surrounding of the vehicle may affect the air quality in the surrounding of the vehicle, namely affect the second sensing data.

In some embodiments of the control unit, the second data includes data indicative of air pollution in the vehicle's surrounding. This data can be obtained, for example, from one or more air pollution monitoring stations that are at the vicinity of the vehicle, from weather monitoring stations, external sensors that are installed on the vehicle, third party's data, or any combination thereof.

In some embodiments of the control unit, the first sensing data comprises data indicative of size and quantity, or concentration, of particulate matter in the cabin. Furthermore, the sensing data may comprise data indicative of concentration and average size of particulate matter in the air within the vehicle. For example, the first sensing data may be indicative of the presence and quantification of particles up to 10 microns.

In some embodiments of the control unit, the input module is configured to receive first sensing data that comprises data indicative of at least one of the following: concentration of volatile organic compound (VOC), humidity, temperature, concentration of $CO_2$, concentration of $NO_2$ or concentration of $O_2$ or any combination thereof. In some embodiments of the control unit, the first data comprises data indicative of concentration or quantity of at least one of CO, $SO_2$, Ozone, NO, NOx, Formaldehyde, Benzene, Methanol. Furthermore, the first data may include data indicative of air pressure in the cabin, light inside and outside the cabin. In some embodiments, the processing module is further configured to determine the relation between levels of air quality of the cabin and the surrounding of the vehicle, namely giving comparable score to the quality of the air inside the cabin and outside the cabin and determine whether it is required to exchange air with the surrounding to improve the air quality in the cabin of the vehicle. For example, in case the air in the surrounding of the vehicle is more polluted with respect to the interior of the vehicle, the operative data may include operations that minimize circulation of air from outside, e.g. closing all the windows and tuning the vent of the air condition system to a maximum level such that the net flow of air is from the interior of the cabin of the vehicle to the outside environment or vice versa.

In some embodiments, the operative data that is generated by the processing module includes instructions for circulating the air in the cabin. These instructions may include at least one of: opening windows to a certain extent and for a desired period of time, operating the air condition system to a certain venting level, switching the circulation mode of the air condition system from a re-circulation mode to an external circulation mode or vice versa, or any combination thereof.

In some embodiments of the control unit, the output module is configured to transmit the calculated cabin's air quality data and/or the operative data to a displaying device for displaying the operative data for a user, e.g. a mobile device.

In some embodiments of the control unit, the output module is configured to transmit the operative data to a climate control system of the vehicle to be executed thereby. Namely, the list of operations of the operative data are received by a system of the vehicle that controls the circulation and the climate of the air within the cabin of the vehicle, and the system automatically executes the operations.

In some embodiments of the control unit, the output module is coupled to, namely in data communication with, a system that controls the circulation and the climate of the vehicle and is configured to operate it based on the operative data.

It is to be noted that the user may receive a notification, e.g. via a mobile device, that allows him/her to decide whether to permit the system to perform the operations automatically or not.

In some embodiments of the control unit, the input module is further configured to receive data related to the type of the vehicle, e.g. the manufacturer, the year of manufacturing, etc., and the operative data is generated further based on the data related to the type of the vehicle. This data may be indicative of the air filter(s) that are installed in the vehicle and their usability status.

In some embodiments of the control unit, the calculated cabin's air quality data includes smoking score indicative of smoking residues or smell being monitored in the cabin. Namely, the smoking score indicating the levels of smoking trails that are found in the cabin. The smoking score may be outputted to a signaling unit, e.g. a LED indicating the presence of smoking residues in the car and/or the smoking score may be configured to be presented on an API, web-based dashboard or any displaying unit. The presentation of the smoking score may be a binary presentation, indicating whether there are smoking substances or residues in the car above a certain threshold or not, and may be a level-based presentation, showing the level of monitored smoking residues in the car.

In some embodiments of the control unit, the processing module is configured for analyzing temporal profile of the first data, recognizing patterns therein indicative of smoking and determining, or updating, the smoking score based thereon. The processing module identifies variations in the first data over time and classifies these variations to smoking events, which affect the smoking score.

In some embodiments of the control unit, the calculated cabin's air quality data includes classification of odors types in the cabin, namely the processing module is configured to identify and classify types of odors based on the first data.

In some embodiments of the control unit, the first data includes data indicative of at least one of the following: concentration of Formaldehyde, Benzene, Methanol, particulate matter, VOC and $SO_2$ and the processing module is configured to identify types of odors based thereon. It may be that based on a certain relation between profiles of at least two of Formaldehyde, Benzene, Methanol and $SO_2$ the type of odor is identified.

In some embodiments of the control unit, the processing module is further configured to determine filter data indicative of the filter status, i.e. its functionality status, of the filter of the air condition system of the vehicle and said output module is configured to output said filter data.

In some embodiments of the control unit, the filter data includes filter score indicative of the status of the filter of the air condition system of the vehicle. Upon reaching a selected filter score threshold, the output module is configured to output an alert for replacing the filter. The score of the filter and its performance are calculated and monitored over time and upon identifying a variation of its performance that exceeds a certain threshold, the alert is being outputted to the user. In addition, the filter status may be obtained by determining the behavior profile of the filter under a set of known conditions. Under these known conditions, the performance profile of the filter is expected and by applying pattern recognition on the first input data under these conditions, the status of the filter may be determined. By identifying anomaly in the pattern of the data, an alert of the status of the filter is outputted. In some embodiments, the output module is configured to transmit the calculated cabin's air quality data or filter data to a remote server, e.g. the cloud, to be stored therein or to be readable therefrom in real-time by an authorized user. The output module is configured to transmit the filter data by wireless connectivity, e.g. by cellular connectivity via the cellular network.

In some embodiments, the control unit is configured to receive operations made by the user in the air condition system of the vehicle. The control unit is configured to recognize repeating pattern and identify preferences parameters of the user, e.g. temperature and air flow of the air condition system for a given ambient condition, e.g. outside temperatures, humidity and daytime. The control unit may operate automatically the air condition system based on the known preferences patterns of the user of the vehicle to bring the cabin's air condition to the desired state of the user.

Another aspect of the present disclosure provides a system for mapping air quality. The system includes a receiving module that is configured to receive the calculated cabin's air quality data from a plurality of control units according to any of the above disclosed embodiments. The calculated cabin's air quality data further includes positioning data of each control unit, namely the data of the air quality from each control unit is associated with real-time positioning data of the control unit transmitted the air quality data. The system further includes a mapping module configured to generate an air quality map based on the plurality of the received calculated cabin's air quality data. The mapping module is further configured to transmit the air quality map to any receiving unit suitable for receiving said quality map data.

In some embodiments, the system further includes a display unit for presenting the air quality map.

Another aspect of the present disclosure provides a system for monitoring the air of a cabin of a vehicle. The system includes a sensing unit that comprises at least one sensor configured to sense the air quality in the cabin such that the sensing unit generates the first sensing data based thereon.

The system further includes a control unit according to any of the above-disclosed embodiments.

In some embodiments of the system, the sensing unit includes a particulate matter sensor that is configured to sense at least one of size, quantity and concentration of particulate matter in the air of the cabin. The particulate matter sensor may also provide data indicative of concentration and average size of particulate matter in the air within the cabin of the vehicle. For example, the particulate matter sensor is configured to sense size, quantity or concentration of particles up to 10 microns.

In some embodiments of the system, the sensing unit comprises at least one of the following sensors: VOC sensor, humidity, temperature, $CO_2$ sensor, $NO_2$ sensor or $O_2$ sensor, or any combination thereof. In some embodiments, the system includes sensor configured to provide data indicative of at least one of the following substances: CO, $SO_2$, Ozone, NO, NOx, Formaldehyde, Benzene, Methanol. Furthermore, the system may include at least one sensor that is configured to provide data indicative of at least one of the following: the air pressure in the cabin and light inside and outside the cabin.

Any of the VOC sensor, particulate matter sensor, the $NO_2$ sensor or any sensor that provides data on one of CO, $SO_2$, Ozone, NO, NOx, Formaldehyde, Benzene or Methanol substances may require a calibration based on the temperature and/or humidity in the cabin of the vehicle. Thus, the VOC sensor, in some embodiments, is in data communication with the humidity and temperature sensor(s) to receive their sensed data of humidity and temperature. The VOC sensor is configured for calibration based on this data to improve its performances. Namely, based on the sensed temperature or humidity, the reading of the sensed parameters in at least one of the VOC, particulate matter or $NO_2$ sensor is being corrected by a known biasing function.

In some embodiments, the sensors may be distributed within the vehicle to provide sensing data from different location of the cabin of the vehicle. The control unit is configured to discern between sensing data derived from different location within the vehicle, process the data and generate corresponding calculated cabin's air quality data and/or operative data based thereon.

In some embodiments, the system includes a second sensing unit that comprises at least one sensor for sensing the air quality in the surrounding of the car. For example, the sensor may be installed on the outside of the vehicle's chassis. The sensor may be of any kind of the following: particulate matter sensor VOC sensor, humidity, temperature, $CO_2$ sensor, $NO_2$ sensor or $O_2$ sensor, or any combination thereof.

In some embodiments, the system further includes a real-time positioning system for providing real-time location of the system and the vehicle.

In some embodiments, the system further comprises an air quality indicator that is configured to produce an indication to a user of the air quality in the cabin, e.g. by one or more discernable LED outputs. The output module is configured to transmit the calculated cabin's air quality data to the air quality indicator such that a corresponding indications of the air quality in the cabin is presented to the user.

In some embodiments, the system further includes a user interface that is configured to control the operation of the control unit and the sensing unit, namely tune thresholds, select automatic or manual operation mode, controlling the operation of one or more of the sensors, etc.

Yet another aspect of the present disclosure provides a method for monitoring or controlling the air quality of a vehicle cabin, e.g. a cabin of a car. The method comprising receiving a first sensing data indicative of sensed parameters of air within the cabin of the vehicle; processing the first sensing data generating (i) calculated cabin's air quality data and, optionally (ii) operative data based on the sensing data, wherein the calculated cabin's air quality data is indicative of the air quality in the cabin of the vehicle, and wherein the operative data comprises operations for execution of defined actions for improving the air quality in the cabin; and outputting the calculated cabin's air quality data or the operative data.

In some embodiments, the method includes receiving second data indicative of quality of air outside to the vehicle. The method further includes processing the first sensing data and the second data and generating, based thereon, the (i) calculated cabin's air quality data and, optionally the (ii) operative data.

In some embodiments of the method, the second data comprises data indicative of cars traffic or the air pollution in the vehicle's surrounding.

In some embodiments of the method, the first sensing data comprises data indicative of size and quantity of particulate matter in the cabin.

In some embodiments, the first sensing data comprises data indicative of at least one of the following: concentration of volatile organic compound, humidity, temperature, concentration of $CO_2$, concentration of $NO_2$ or concentration of $O_2$.

In some embodiments, the first sensing data comprises data pieces that are each indicative of sensed parameters of air of different locations within the cabin of the vehicle, e.g. a top, bottom, rear or front portion of the vehicle.

In some embodiments, the method further includes determining a relation between levels of air quality of the cabin and the surrounding of the vehicle and providing, based on the relation, optimal solution for circulating the air within the vehicle to improve the quality thereof.

In some embodiments, the operative data comprises operative instructions for circulating the air in the cabin.

In some embodiments, the circulating the air in the cabin comprises at least one of: opening windows for a desired extent and period of time, tuning the air condition for a desired temperature, desired venting power and desired circulation mode, or any combination thereof.

In some embodiments, the method further includes transmitting at least one of the calculated cabin's air quality data and the operative data to a device that comprises a display for displaying the operative data for a user. The method may further include displaying the operative data to a user.

In some embodiments, the method includes transmitting the operative data to a system of the vehicle that is configured and operable to control the circulation and the climate conditions within the vehicle, such that the system executing the operative data.

In some embodiments, the method includes operating a climate control system of the vehicle, which is configured and operable to control the circulation and the climate conditions within the vehicle, based on the operative data.

In some embodiments, the method includes receiving data related to the type of the vehicle and generating the operative data based thereon in combination with the first sensing data and/or the second data.

In some embodiments of the method, the calculated cabin's air quality data includes smoking score indicative of smoking residues or smell being monitored in the cabin.

In some embodiments, the method further includes analyzing temporal profile of the first data, recognizing patterns therein indicative of smoking and determining, or updating, the smoking score based thereon. The method includes identifying variations in the first data over time and classifies these variations to smoking events, which affect the smoking score.

In some embodiments of the method, the cabin's air quality data includes classification of odors types in the cabin.

In some embodiments of the method, the first data includes data indicative of at least one of the following: concentration of Formaldehyde, Benzene, Methanol and $SO_2$ and the method further comprising identifying types of odors based thereon. In some embodiments, the method includes identifying odors based on relation between profiles of at least two of Formaldehyde, Benzene, Methanol and $SO_2$.

In some embodiments, the method further includes determining filter data indicative of the filter status, i.e. the functionality of the filter of the air condition system of the vehicle and outputting said filter data.

In some embodiments of the method, the filter data includes filter score indicative of the status of the filter of the air condition system of vehicle, and upon identifying a selected filter score threshold the method includes outputting an alert for replacing the filter.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
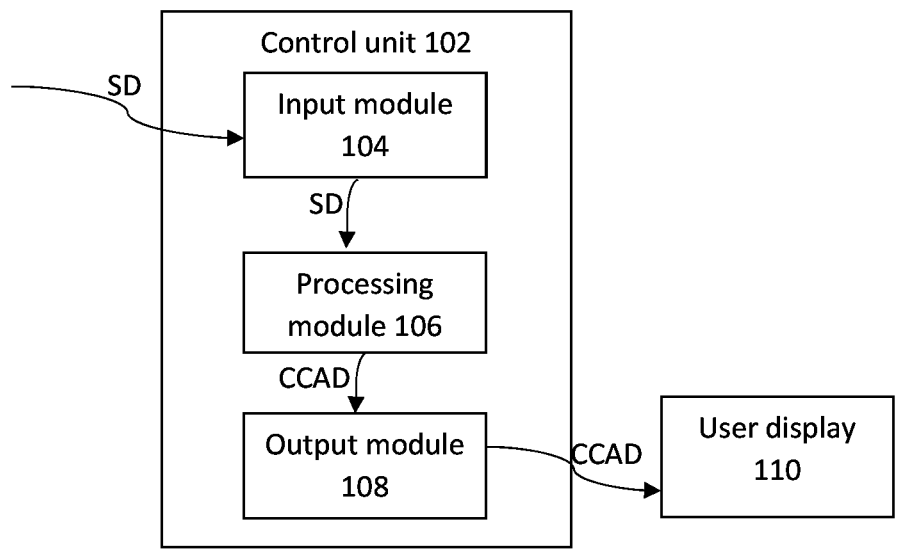
FIGS. 1A-1C are block diagrams of non-limiting examples of embodiments of the control unit of the present disclosure.
Figure 1B:
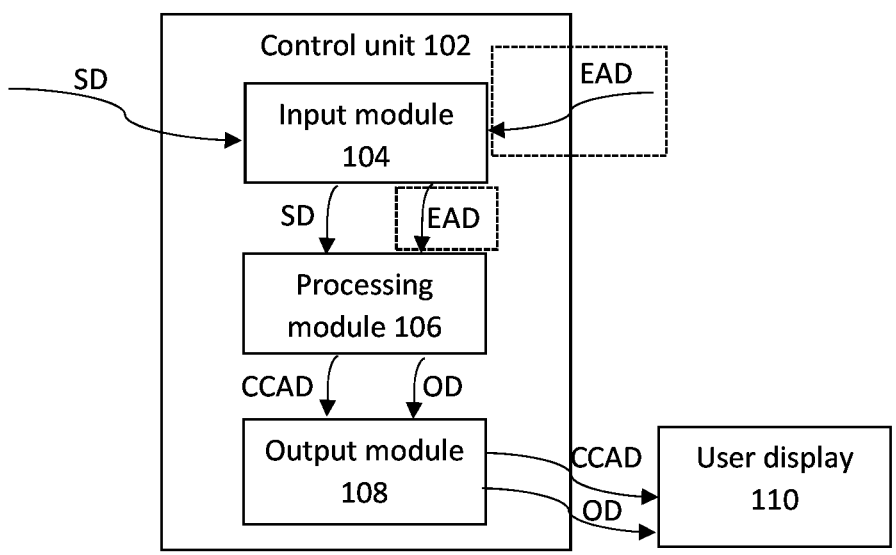
Figure 1C:
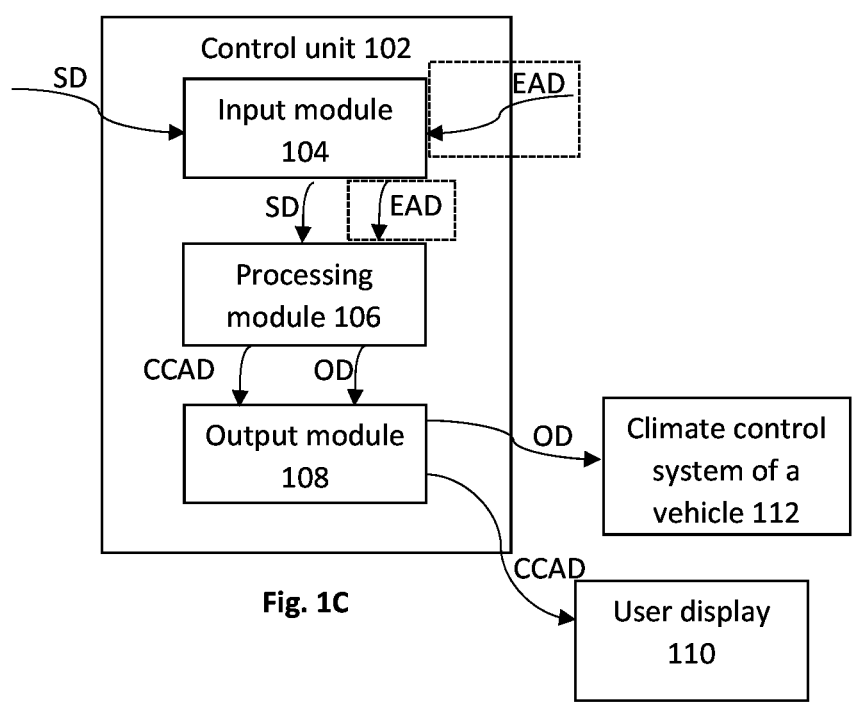

Reference is first made to FIGS. 1A-1C, which are block diagrams of non-limiting examples of embodiments of the control unit of the present disclosure. FIG. 1 shows a control unit 102 for monitoring and/or controlling the air quality of a vehicle cabin, e.g. a cabin of a car. The control unit includes an input module 104 that is configured to receive sensing data SD that is indicative of sensed parameters of the air of the vehicle cabin. The sensed parameters can be derived from one or more sensors such as particulate matter sensor, volatile organic compound (VOC) sensor or specific molecular sensitive sensors (e.g. oxygen, $CO_2$, $NO_2$, etc. Thus, the sensing data SD may include raw or processed data that is derived from such sensors.

The processing module 106 is configured to receive the sensing data SD and process it to generate calculated cabin's air quality data CCAD, which is a summarization of all the sensing data SD into a unified data. For example, the calculated cabin's air quality data CCAD may be a level of the quality of the air in the cabin, which can be also detailed to levels of specific parameters, e.g. the level of smoking smell, human body smell, polluting particles, etc.

An output module 108 receives the calculated cabin's air quality data CCAD and transmits it to a user's display 110 to be displayed to a user. In this manner, the user, which can be at a remote location from the car, may have real-time status of the quality of air in the vehicle. Accordingly, the user may operate the climate control system of the vehicle to improve the air quality within, whether it is performed when the user is remote from the vehicle or when the user manually operates the climate control system while in the vehicle. The user can monitor the air quality over time and observe the change due to the operations of the climate control system, e.g. tuning the air condition (temperature, venting power), opening one or more windows to a period of time, etc.

Optionally, the input module may be configured to receive external air quality data EAD indicative of the air quality outside the vehicle, namely at the surrounding thereof. This data may be derived from air pollution monitoring stations that are at the vicinity of the vehicle and/or by weather monitoring stations, etc. This data may also be an average of several monitoring stations that are surrounding the vehicle, and the relevant data from the relevant stations is retrieved according to the real-time location of the vehicle, e.g.

according to GPS data of the vehicle or systems of the vehicle that are transmitting the real-time location to the control unit 102. The external air quality data EAD is processed together with the sensing data SD to obtain the optimal operative data OD for improving the air quality in the vehicle, namely whether to circulate the outside air into the vehicle or to what extent.

In another embodiment of the control unit 102, exemplified in FIG. 1B, the processing module 106 processes the sensing data SD, and in addition to the generation of calculated cabin's air quality data CCAD, generates operative data OD indicative of operations for improving the air quality of in the vehicle, e.g. by controlling the climate control unit of the vehicle. The output module 108 outputs to a user's display 110 the operative data OD and the calculated cabin's air quality data CCAD such that the user may follow the operative data to improve the air quality in the vehicle.

FIG. 1C is another embodiment of the control unit of the present disclosure, this embodiment differs from that exemplified in FIG. 1B by that the output module 108 is coupled, either by a direct connection or by wireless connection, to a climate control system of a vehicle 112. The climate control system 112 is capable of controlling at least the air condition system and/or the air circulation openings, e.g. windows or tunable circulation openings. The output module 108 is configured to transmit the operative data OD to the climate control system 112 to be executed automatically thereby.

For example, the operative data may instruct the climate control system 112 to increase the venting power of the vehicle, to lower the temperature of the air condition, to change the mode of air condition circulation to an external circulation and to open two windows of the vehicle half wide open for a period of time of 45 seconds. When the control unit 102 monitors improvement of the air quality in the vehicle above a desired threshold, that may be a default threshold or may be set by a user, the control unit 102 may instruct the climate control system 112 to resume to its regular/previous setting.

In some embodiments, the input module may receive filter data that is indicative of the air filter condition of the vehicle. The control unit indicate the user the status of the air filter in real-time and alert when it needs to be replaced.

It should be noted that the examples of FIGS. 1A-1C focus on selected elements of the system while generally describe various configurations of the control unit. Generally, elements from FIGS. 1A-1C may be combined between them to provide the control unit of the present disclosure.

In the figures throughout the application, like elements of different figures were given similar reference numerals shifted by the number of hundreds corresponding to the number of the figures. For example, element 202 in FIGS. 2A and 2B serves the same function as element 102 in FIGS. 1A-1C.

Figure 2A:
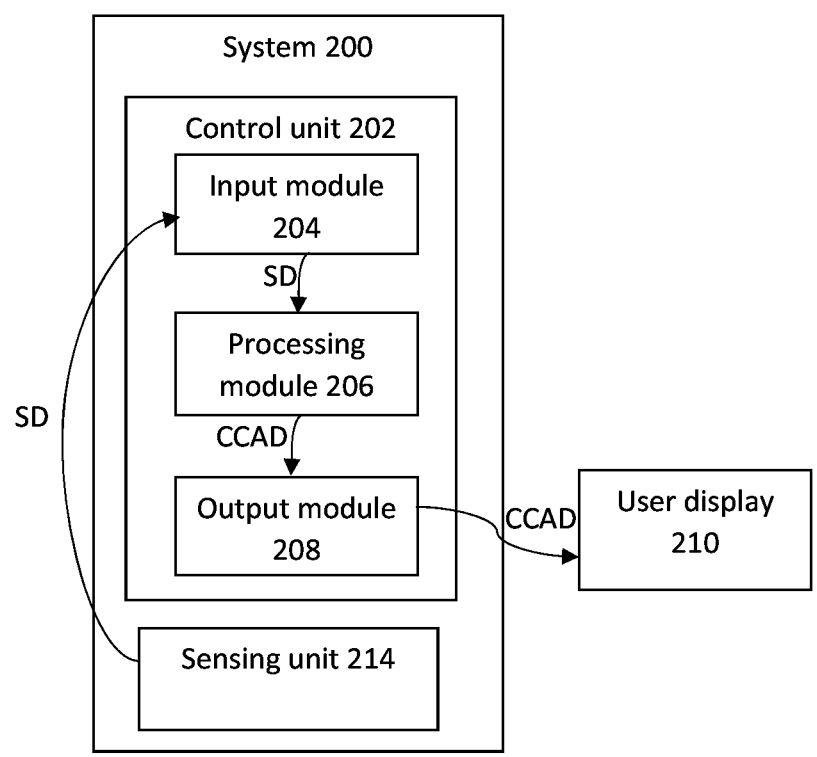
FIGS. 2A-2B are block diagrams of non-limiting examples of embodiments of the system for monitoring and controlling the air quality of a cabin of a vehicle according to the present disclosure.
Figure 2B:
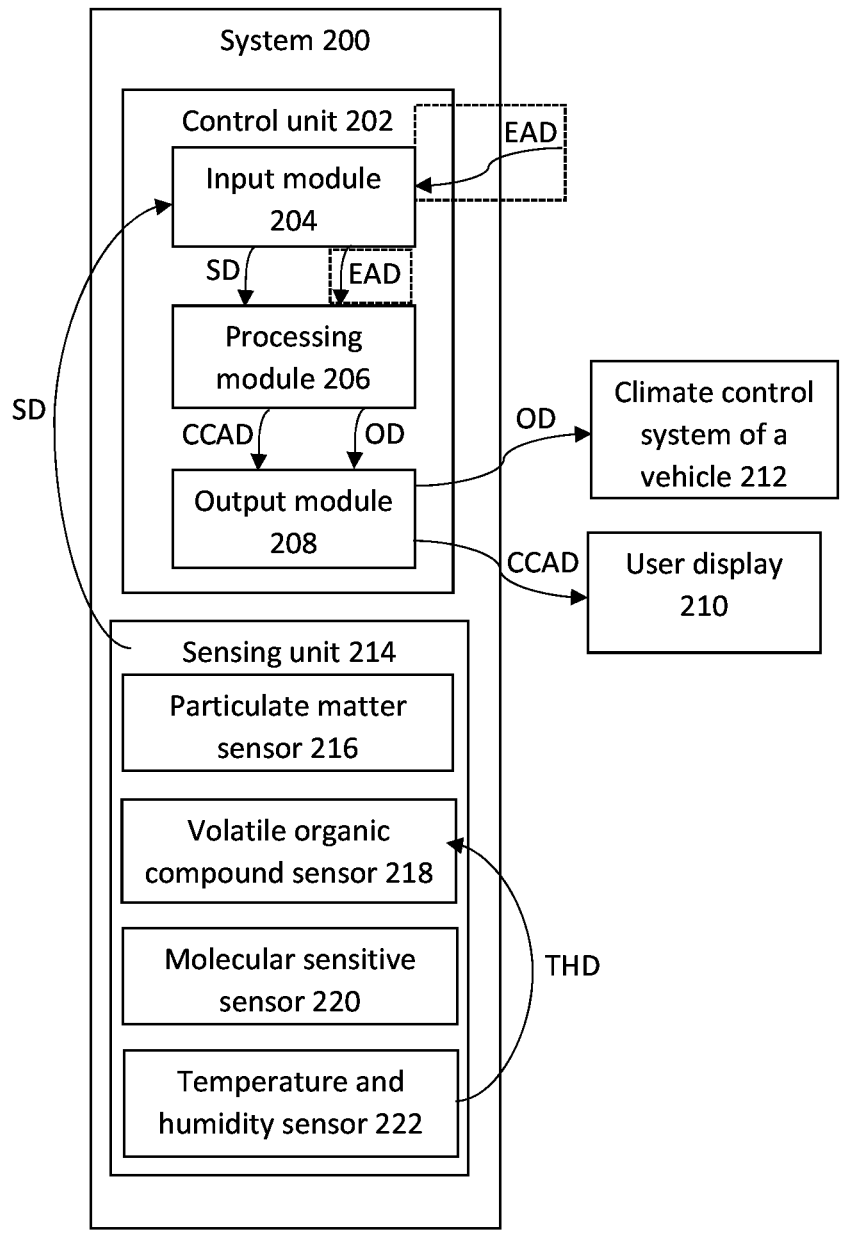

Reference is now made to FIGS. 2A-2B, which are block diagrams of embodiments of a system for monitoring and controlling the air quality of a cabin of a vehicle according to the present disclosure. FIG. 2A shows a system 200, which includes a sensing unit 214 that is configured to sense parameters that are indicative of the quality of the air within the vehicle. The sensing unit 214 may include one or more sensors that together generates sensing data SD based on the sensed parameters.

The control unit 202 of the system includes an input module 204 that is configured to receive the sensing data SD from the sensing unit 214. The processing module 206 processes the sensing data SD and generates calculated cabin's air quality data CCAD based on the sensing data SD that comprises the sensing parameters sensed by the one or more sensors in the vehicle.

The output module 208 transmit the calculated cabin's air quality data CCAD to a user display 210 to be displayed to a user.

The embodiment of FIG. 2B differs from that presented in FIG. 2A by (i) detailing the sensors of the sensing unit and (ii) presenting additional capability of the control unit for generating operative data.

As can be appreciated, the sensing unit 214 comprises particulate matter sensor 216, VOC sensor 218, molecular sensitive sensor 220, e.g. sensor that senses the concentration of $CO_2$, $NO_2$, $O_2$, etc., and temperature and humidity sensor. It is to be noted that these sensors are mere examples of optional combination of sensors and the sensing unit 214 may include any combination of sensors that provide relevant data of the air quality of the interior of the vehicle.

The temperature and humidity sensors generates temperature and humidity data THD that, in addition of being part of the general sensing data SD is transmitted to the VOC sensor 218, which requires the temperature and humidity data THD for self-calibration to optimize its performances. It is to be noted that the calibration can be performed by the control unit 202, namely that the control unit 202 is configured to receive the temperature and humidity data THD and to calibrate the VOC sensor 218 based thereon.

The sensing parameters from all the sensors of the sensing unit 214 provide the sensing data SD that is transmitted to the input module 204 of the control unit 202.

The processing module 206 processing the sensing data SD and optionally the external air quality data EAD that is indicative of the air quality in the surrounding of the vehicle and generates calculated cabin's air quality data CCAD and operative data OD. The operative data OD is transmitted to climate control system of the vehicle 212 to be executed thereby to improve the level of air quality within the vehicle.

Figure 3:
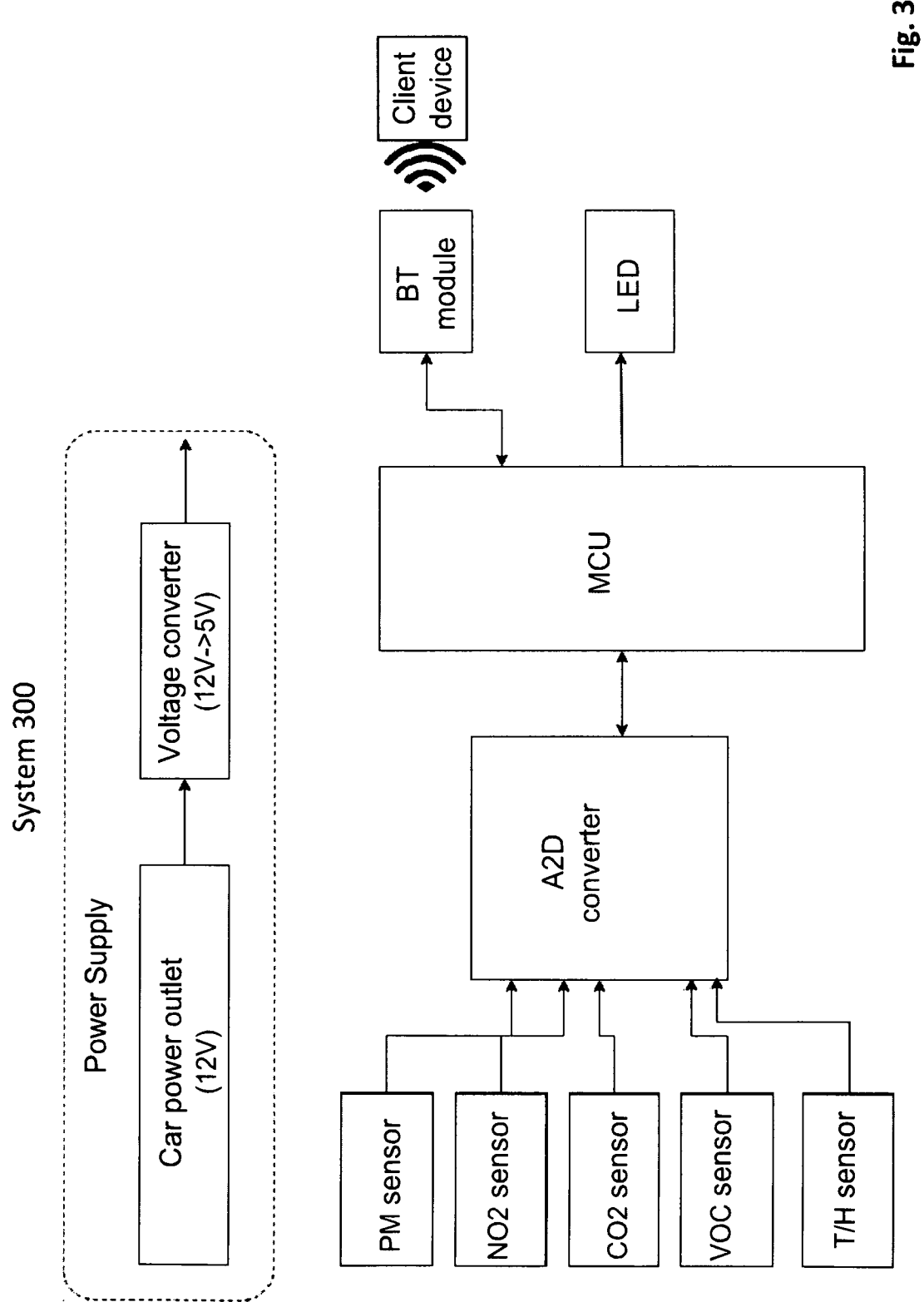
FIG. 3 is a block-diagram of a non-limiting example of the system according to an embodiment of the present disclosure.

FIG. 3 is additional block-diagram of a non-limiting example of the system according to an embodiment of the present disclosure. The system 300 includes an array of five sensors—particulate matter sensor, VOC sensor, $CO_2$ sensor, $NO_2$ sensor, and temperature and humidity sensor, each transmits its sensed data to an analog to digital converter A2D converter. The data from the converter is transmitted to a micro controller unit MCU that processes the sensed data and transmits the information of the air quality in the vehicle to a receiving client device, e.g. a car infotainment, a web-based dashboard or a mobile device such as smartphone via wireless communication module wireless module. The system further includes indicator in the form of LED array LED I/O. The level of the air quality, which can be divided into two or more levels (for example: level 1—excellent quality, level 2—good quality, level 3—bad quality), may be indicated by a corresponding LED color that is identifiable by a passenger in the car.

The power to the system may be supplied through a vehicle power outlet such as the car power outlet and the voltage may be converted to meet the voltage requirements of the system.

Figure 4A:
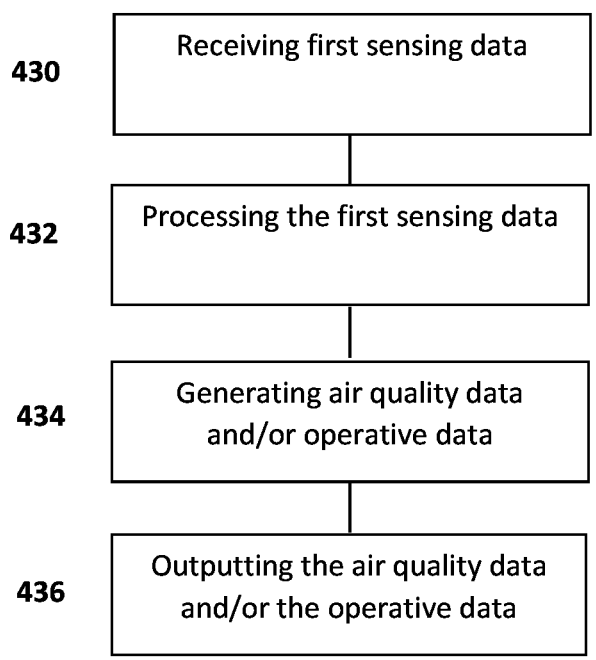
FIGS. 4A-4B are flow diagrams of non-limiting examples of embodiments of the method for monitoring and controlling the air quality of a cabin of a vehicle according to the present disclosure.
Figure 4B:
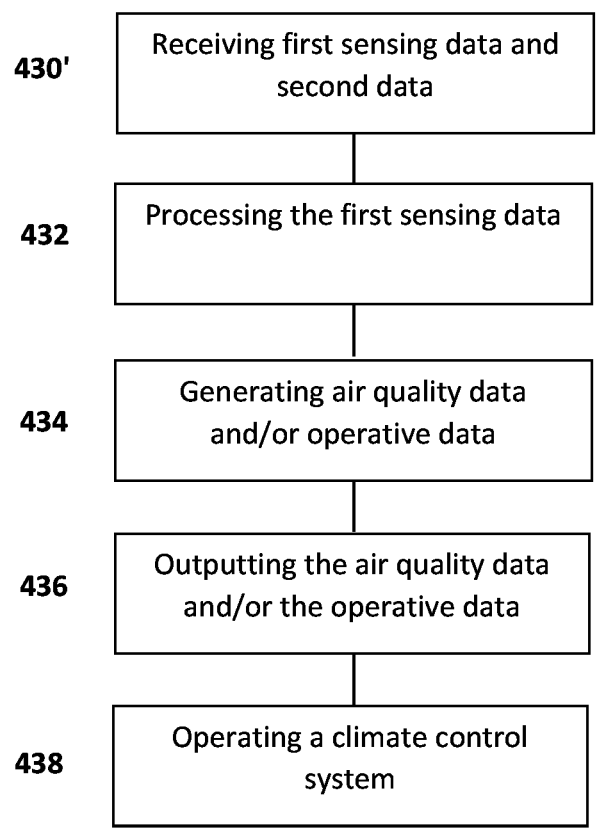

FIGS. 4A-4B are flow diagrams presenting non-limiting examples of embodiments of the method according to the present disclosure. FIG. 4A shows a method that includes receiving a first sensing data 430 indicative of sensed parameters of the air within a cabin of a vehicle, e.g. a car. The method further includes processing the first sensing data 432 and generating 434 calculated cabin's air quality data and/or operative data. The method further includes outputting the calculated cabin's air quality data and/or operative data, e.g. displaying it to a user or transmitting it to a climate control system of the vehicle to execute the required actions of the operative data.

FIG. 4B presents an embodiment of the method that differs from that of FIG. 4A by receiving a second data in addition to the first sensing data 430', wherein the second data is indicative of the air quality in the surrounding of the vehicle. It further differs by that it includes operating a climate control system 438 of the vehicle based on the operative data.

Figure 5:
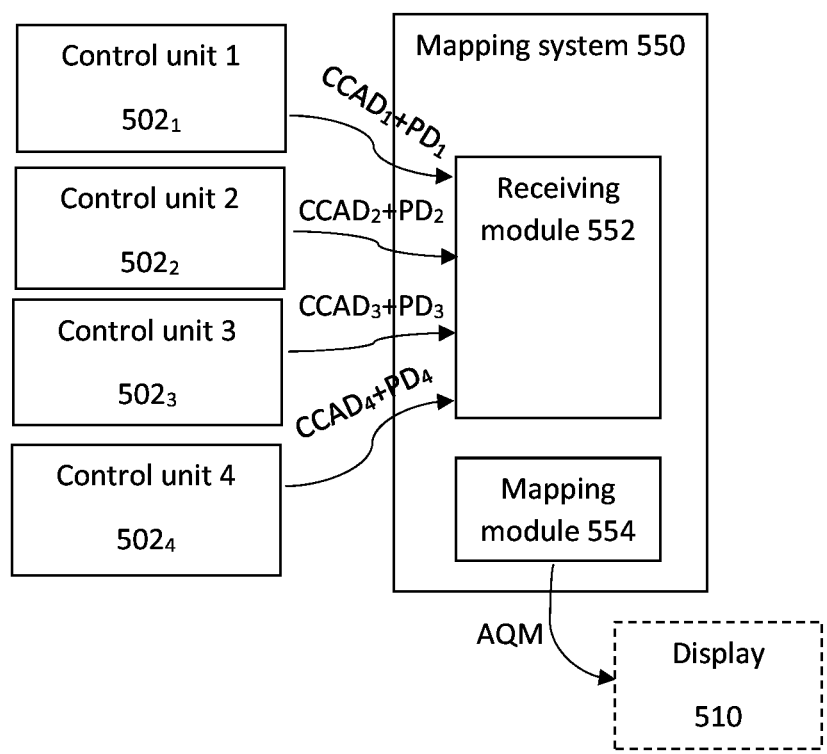
FIG. 5 is a block diagram of a non-limiting example of an embodiment of a mapping system according to an aspect of the present disclosure.

FIG. 5 is a block diagram of a non-limiting example of an air quality mapping system, according to an aspect of the present disclosure. The mapping system 550 includes receiving module 552 that is configured to receive calculated cabin's air quality data $CCAD_i$ (i=1, 2, 3 ... n) and respective positioning data $PD_i$ (i=1, 2, 3 ... n) from a plurality of respective control units $502_i$ (i=1, 2, 3 ... n). The mapping system includes a mapping module that is configured to process the received calculated cabin's air quality data $CCAD_i$ together with the positioning data associated with each cabin's air quality data $CCAD_i$ and generate an air quality map AQM based thereon. The air quality map AQM is transmitted to a display unit 510 configured to display the air quality map AQM to a user.

The invention claimed is:

1. A control unit for monitoring and/or controlling the air quality of a vehicle cabin, the control unit comprising:
an input module configured to receive first sensing data indicative of sensed parameters of air within the cabin of the vehicle, wherein the first sensing data comprises data indicative of size, quantity and concentration of particulate matter in the cabin;
processing module configured to process the first sensing data and to generate calculated cabin's air quality data, said calculated cabin's air quality data comprises smoking score indicative of levels of smoking residues or smoking smell being monitored in the cabin, wherein the calculated cabin's air quality data is indicative of the air quality in the cabin of the vehicle; and
an output module for outputting the calculated cabin's air quality data;
wherein said processing module is configured for analyzing temporal profile of the first sensing data, recognizing patterns therein indicative of smoking to determine said smoking score.

2. The control unit of claim 1, wherein the input module is configured to receive second data indicative of quality of air outside to the vehicle, and the processing module is configured to process the first sensing data and the second data, and to generate the calculated cabin's air quality data; wherein the second data comprises data indicative of cars traffic in the vehicle's surrounding or data indicative of air pollution in the vehicle's surrounding.

3. The control unit of claim 1, wherein the processing module is configured to process the first sensing data and to generate operative data based thereon, wherein the operative data comprises operations for execution of defined actions for improving the air quality in the cabin; and wherein the output module is configured for outputting the operative data.

4. The control unit of claim 1, wherein the first sensing data further comprises data indicative of at least one of the following: concentration of volatile organic compound, temperature, humidity, concentration of $CO_2$, concentration of $NO_2$ or concentration of $O_2$.

5. The control unit of claim 2, wherein the processing module is configured to determine the relation between levels of air quality of the cabin and the surrounding of the vehicle.

6. The control unit of claim 3, wherein the operative data comprises operative instructions for circulating the air in the cabin, wherein the circulating the air in the cabin comprises at least one of: opening windows, operating the air condition, or any combination thereof.

7. The control unit of claim 3, wherein the output module is configured to transmit at least one of the calculated cabin's air quality data and the operative data to a device that comprises a display for displaying the operative data for a user and to transmit the operative data to an automatic climate control system of the vehicle to be executed thereby.

8. The control unit of claim 3, wherein the input module is further configured to receive data related to the type of the vehicle and the operative data is generated further based on the data related to the type of the vehicle.

9. The control unit of claim 1, the first data comprises data indicative of at least one of the following: concentration of Formaldehyde, Benzene, Methanol and $SO_2$ and the processing module is configured to identify types of odors based thereon such that said calculated cabin's air quality data comprises classification of odor types in the cabin.

10. The control unit of claim 1, wherein the processing module is further configured to determine filter data indicative of the filter status of the filter of the air condition system of the vehicle and said output module is configured to output said filter data.

11. The control unit of claim 1, wherein said filter data comprises filter score indicative of the status of the filter of the air condition system of vehicle, upon reaching a selected filter score threshold the output module is configured to output an alert for replacing the filter.

12. A system for mapping air quality, comprising:
a receiving module configured to receive the calculated cabin's air quality data from a plurality of control units according to claim 1, wherein said calculated cabin's air quality data further comprises positioning data of each control unit;
a mapping module configured to generate an air quality map based on the plurality of said received calculated cabin's air quality data, wherein said mapping module is further configured to transmit said air quality map.

13. A system for monitoring the air of a cabin of a vehicle, the system comprising:
a sensing unit that comprises at least one sensor that is configured to sense the air quality in the cabin and generates the first sensing data based thereon; and
a control unit of claim 1.

14. A method for monitoring or controlling the air quality of a vehicle cabin, the method comprising:
receiving a first sensing data indicative of sensed parameters of air within the cabin of the vehicle, wherein the first sensing data comprises data indicative of size, quantity and concentration of particulate matter in the cabin;
processing the first sensing data for generating calculated cabin's air quality data, said calculated cabin's air quality data comprises smoking score indicative of smoking residues or smoking smell being monitored in the cabin, wherein the calculated cabin's air quality data is indicative of the air quality in the cabin of the vehicle;
outputting the calculated cabin's air quality data; and analyzing temporal profile of the first sensing data, recognizing patterns therein indicative of smoking to determine said smoking score.

15. The method of claim 14, comprising receiving second data indicative of quality of air outside to the vehicle, wherein said second data comprises data indicative of cars traffic in the vehicle's surrounding or data indicative of air pollution in the vehicle's surrounding; and processing the first sensing data and the second data and generating based thereon the calculated cabin's air quality data.

16. The method of claim 14, wherein said processing the first sensing data further comprises generating operative data based on the first sensing data, wherein the operative data comprises operations for execution of defined actions for improving the air quality in the cabin;

wherein the operative data comprises operative instructions for circulating the air in the cabin, said circulating the air in the cabin comprises at least one of: opening windows, operating the air condition, or any combination thereof; and wherein said outputting further comprises outputting said operative data.

17. The method of claim 16, comprising transmitting the operative data to an automatic climate control system of the vehicle to be executed thereby.

18. The method of claim 14, wherein said calculated cabin's air quality data comprises classification of odor types in the cabin.

19. The method of claim 14, wherein said filter data comprises filter score indicative of the status of the filter of the air condition system of vehicle, and upon identifying a selected filter score threshold outputting an alert for replacing the filter.

* * * * *